US008345634B2

(12) United States Patent
Lee et al.

(10) Patent No.: US 8,345,634 B2
(45) Date of Patent: Jan. 1, 2013

(54) METHOD AND APPARATUS FOR SUPPORTING CO-LOCATED COEXISTENCE MODE

(75) Inventors: Jin Lee, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 12/772,033

(22) Filed: Apr. 30, 2010

(65) Prior Publication Data

US 2011/0128934 A1    Jun. 2, 2011

Related U.S. Application Data

(60) Provisional application No. 61/173,988, filed on Apr. 30, 2009, provisional application No. 61/225,181, filed on Jul. 13, 2009.

(30) Foreign Application Priority Data

Aug. 19, 2009    (KR) ........................ 10-2009-0076634

(51) Int. Cl.
*H04Q 7/00*    (2006.01)
(52) U.S. Cl. ....................................................... 370/331
(58) Field of Classification Search ........................ None
See application file for complete search history.

(56) References Cited

U.S. PATENT DOCUMENTS

| 2008/0031195 | A1  | 2/2008 | Ha |
|---|---|---|---|
| 2008/0233961 | A1  | 9/2008 | Cho et al. |
| 2009/0092100 | A1* | 4/2009 | Lee et al. ...................... 370/332 |
| 2009/0197639 | A1* | 8/2009 | Khairmode et al. ....... 455/553.1 |
| 2010/0056136 | A1* | 3/2010 | Zhu ............................. 455/426.1 |
| 2010/0061326 | A1* | 3/2010 | Lee et al. ...................... 370/329 |

FOREIGN PATENT DOCUMENTS

| KR | 1020050073113 | 7/2005 |
|---|---|---|
| WO | 2009016035 | 2/2009 |

* cited by examiner

*Primary Examiner* — Hassan Phillips
*Assistant Examiner* — Prenell Jones
(74) *Attorney, Agent, or Firm* — Lee, Hong, Degerman, Kang & Waimey

(57) ABSTRACT

A method and apparatus for reducing interference between systems when a plurality of wireless access systems are co-located are disclosed. To support CLC mode, an MS in the CRC mode transmits a handover request message to a first Base Station (BS) to initiate a handover process, receives a handover command message acknowledging the handover request message from the first BS, transmits a ranging request message to second BS at network reentry after handover, and receives from the second BS a ranging response message including CRC start time information that set by the second BS.

18 Claims, 12 Drawing Sheets

FIG. 5
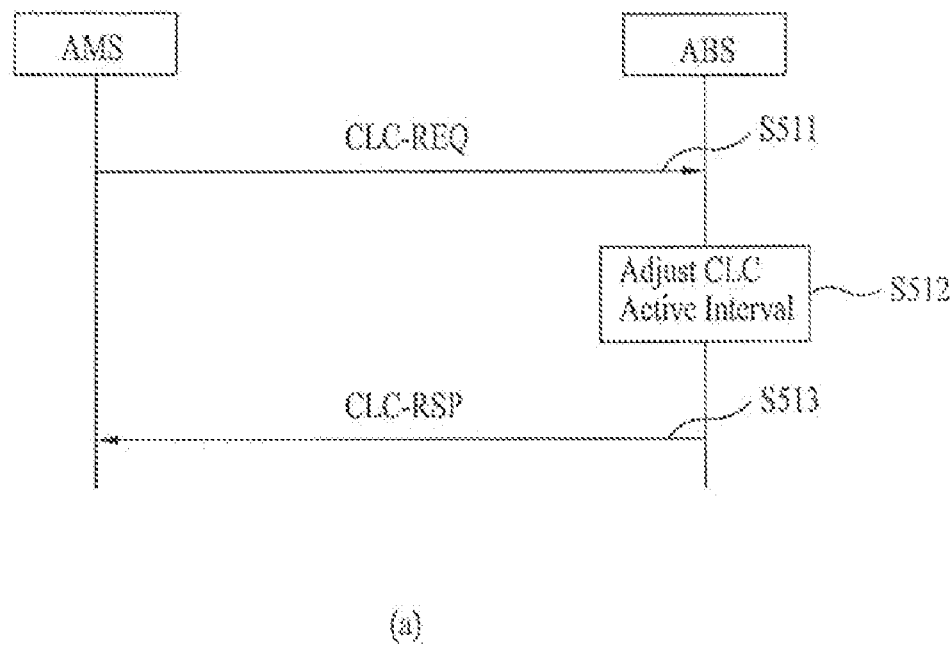
(a)
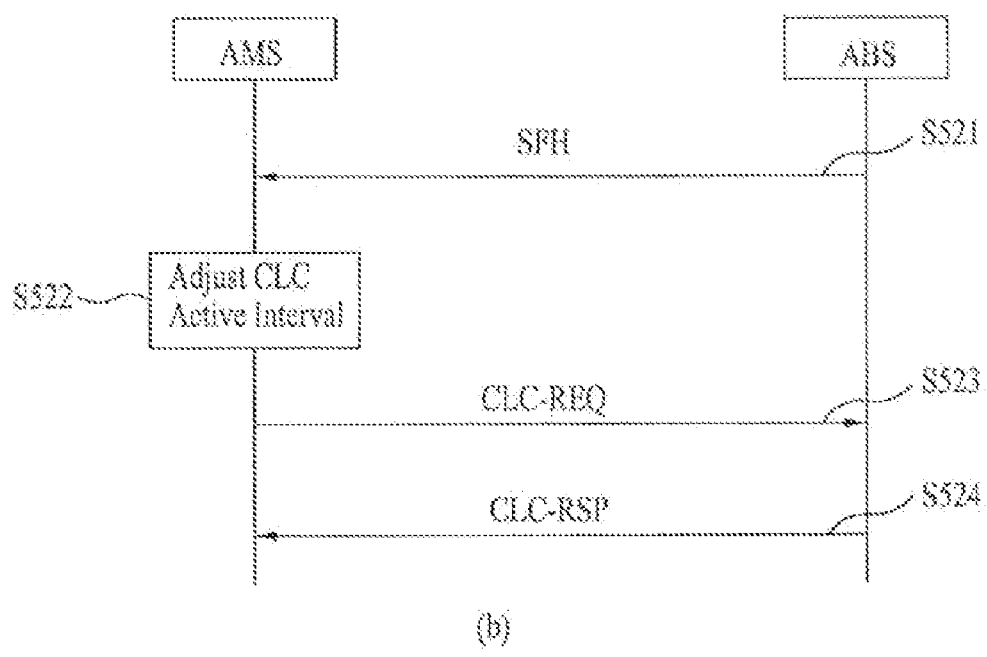
(b)

FIG. 6
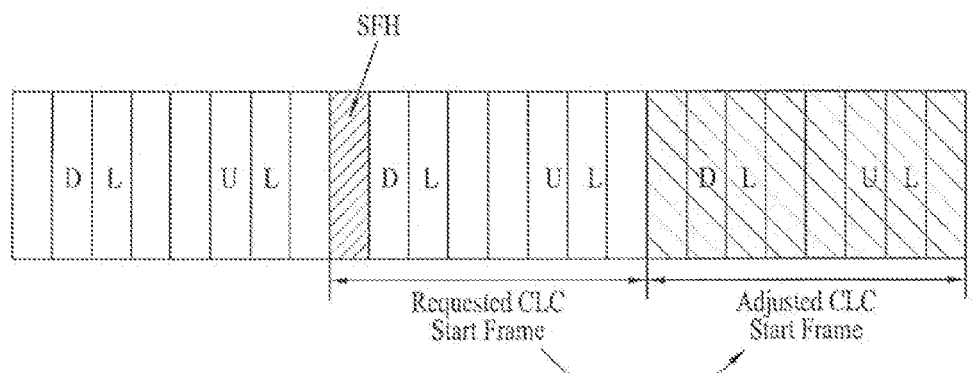
(a)
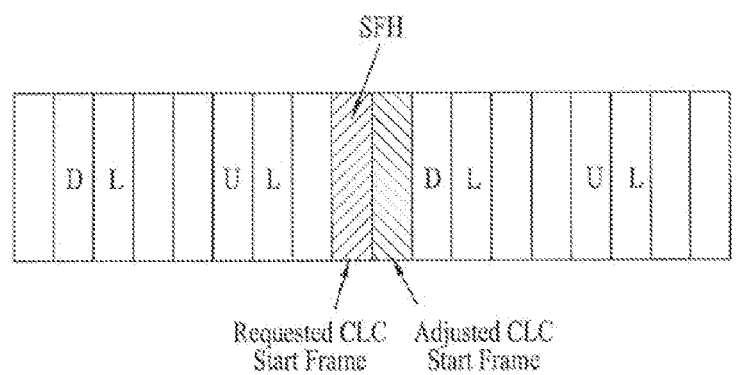
(b)
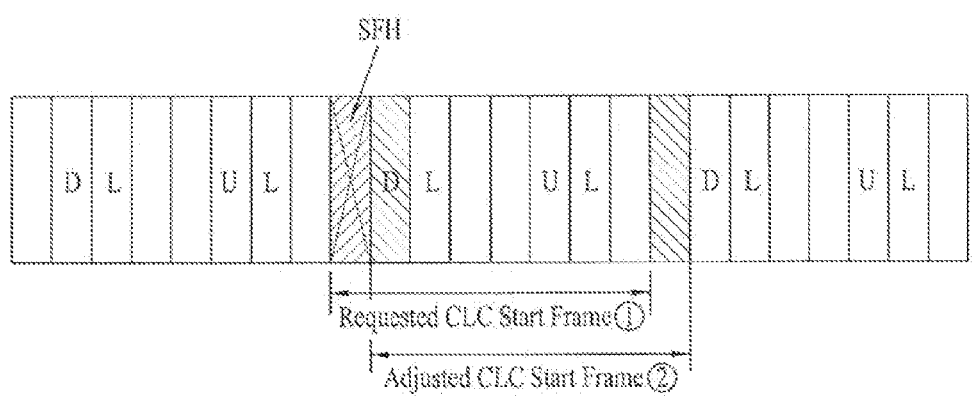
(c)

METHOD AND APPARATUS FOR SUPPORTING CO-LOCATED COEXISTENCE MODE

CROSS-REFERENCE TO RELATED APPLICATIONS

Pursuant to 35 U.S.C. §119, this application claims the benefit of earlier filing date and right of priority to Korean Patent Application No. 10-2009-0076634, filed on Aug. 19, 2009, and also claims the benefit of U.S. Provisional Application Ser. No. 61/173,988, filed on Apr. 30, 2009, the contents of which are hereby incorporated by reference herein in their entirety. This application also claims the benefit of U.S. Provisional Application Ser. No. 61/225,181, filed on Jul. 13, 2009.

BACKGROUND OF THE INVENTION

1. Field of the Invention

The present invention relates to a wireless access system, and more particularly, to a method and apparatus for reducing interference between systems, when a plurality of wireless access systems are coexistent.

2. Discussion of the Related Art

A typical frame structure used for a wireless access system will be described.

FIG. 1 illustrates a frame structure used in a broadband wireless access system (e.g. Institute of Electrical and Electronics Engineers (IEEE) 802.16e)).

Referring to FIG. 1, the horizontal axis of a frame represents the numbers of time units, specifically Orthogonal Frequency Division Multiple Access (OFDMA) symbols and the vertical axis of the frame represents the numbers of frequency units, specifically the logical numbers of subchannels. One frame is divided into data sequence channels each having a predetermined time duration according to its physical characteristics. That is, a frame is divided into a DownLink (DL) subframe and an UpLink (UL) subframe.

The DL subframe may include a preamble, a Frame Control Header (FCH), a DL-MAP, a UL-MAP, and one or more data bursts. The UL subframe may include one or more UL data bursts and a ranging subchannel.

Referring to FIG. 1, the preamble is a predetermined sequence positioned in the first symbol of each frame, for use in acquiring synchronization to a Base Station (BS) and channel estimation at a Mobile Station (MS). The FCH provides channel allocation and channel coding information associated with the DL-MAP. The DL-MAP and the UL-MAP are Medium Access Control (MAC) messages by which DL and UL channel assignments are transmitted to MSs. The data bursts are data units that a BS transmits to MSs or MSs transmit to the BS.

A Downlink Channel Descriptor (DCD) in the frame is a MAC message that describes the physical characteristics of a DL channel, and an Uplink Channel Descriptor (UCD) is a MAC message that describes the physical characteristics of a UL channel.

On a UL, an MS acquires synchronization to a BS by detecting a preamble transmitted from the BS. Subsequently, the MS may decode a DL-MAP using information acquired from an FCH. The BS may transmit scheduling information for DL or UL resource allocation to the MS in every frame, for example, every 5 ms by a DL-MAP/UL-MAP message.

SUMMARY OF THE INVENTION

An existing Worldwide interoperability for Microwave Access (WiMAX) system (e.g. IEEE 802.16e) adopts Power Saving Class (PSC) to save power at an MS. For example, the MS communicates with a Blue Tooth (BT) network during a sleep interval and with a WiMAX network during a listening interval, to thereby minimize interference between the two systems.

However, there is a big difference between the IEEE 802.16m frame structure and the IEEE 802.16e frame structure. Therefore, the PSC of the IEEE 802.16e system is not viable for the IEEE 802.16m frame structure without any modification.

Existing wireless access systems give no regard to a coincidence between the reception time of an SFH and the start time of a CLC active interval for a CLC-mode MS.

Unlike the IEEE 802.16e system, the IEEE 802.16m system may change the transmission position of a MAP message. Both a DL and a UL may be indicated by a MAP within a frame in the IEEE 802.16m system, thus shortening a data transmission delay. Therefore, the IEEE 802.16m system needs a solution to the coincidence of an SFH and a CLC active cycle.

Moreover, there is no specified procedure for initiating CLC mode when a CLC-mode MS stays in the CLC mode even after handover.

When the CLC-mode MS wants to change CLC parameters, it typically exchanges a CLC request (CLC-REQ) message and a CLC Response (CLC-RSP) message with a BS. However, this message exchange may cause signaling overhead.

Accordingly, the present invention is directed to a method and apparatus for supporting co-located coexistence mode that substantially obviates one or more problems due to limitations and disadvantages of the related art.

An object of the present invention is to provide a method for performing a Co-Located Coexistence (CLC) mode operation efficiently at a Mobile Station (MS) and Base Stations (BSs).

Another object of the present invention is to provide a method and apparatus for reducing interference between a Wireless-Fidelity (Wi-Fi) system and an Institute of Electrical and Electronics Engineers (IEEE) 802.16 system, when an MS having a Wi-Fi interface and an IEEE 802.16m interface operates in the two systems.

Another object of the present invention is to provide a method for receiving a service efficiently, while maintaining CLC mode during a handover at an MS, if the MS is operating in the CLC mode in which communication intervals are allocated for communication with different systems.

A further object of the present invention is to provide a method and apparatus for controlling the start time of CLC mode not to overlap with a SuperFrame Header (SFH).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, embodiments of the present invention provide a method and apparatus for reducing interference between systems, when a plurality of wireless access systems coexistent.

In one aspect of the present invention, a method for supporting CLC mode in an MS includes transmitting, by the MS which is in the CLC mode, a handover request (AAI_HO-REQ) message to a first Base Station (e.g. serving base station) to initiate a handover process; receiving a handover command (AAI_HO-CMD) message acknowledging the handover request message from the first BS; transmitting, by the MS to a second BS (e.g. target base station or new serving base station), a ranging request (AAI_RNG-REQ) message at network reentry after handover; and receiving from the second BS a ranging response (AAI_RNG-RSP) message including CLC start time information that set by the second BS.

The method may further comprise steps of suspending the CLC mode after transmitting a handover indication message and reactivating the CLC mode after the MS enters a network of the second base station.

In addition, the method may further comprises steps of suspending the CLC mode at the disconnect time indicated by the handover command message and reactivating the CLC mode after the MS enters a network of the second base station.

In another aspect of the present invention, a method for supporting Co-Located Coexistence (CLC) mode in a first Base Station (BS) comprises steps of obtaining CLC information of a mobile station (MS) from a second base station via backbone network during the MS performs handover preparation; receiving from the MS a ranging request message; and transmitting to the MS a response message including a CLC start time information set by the first BS based on the CLC information, during network reentry, wherein the MS is in the CLC mode.

In another aspect of the present invention, A Mobile Station (MS) for supporting Co-Located Coexistence (CLC) mode, the MS comprises a transmission module for controlling transmission of a first message related to the CLC mode; a reception module for controlling reception of a second message related to the CLC mode; a memory for storing parameters and information elements related to the CLC mode; and a processor for controlling an operation related to the CLC mode.

The processor is able to control steps of transmitting, by the MS which is in the CLC mode, a handover request message to a Serving Base Station (SBS) to initiate a handover process; receiving a handover command message acknowledging the handover request message from the SBS; transmitting, by the MS to a target Base Station (TBS), a ranging request message at network reentry after handover; and receiving from the TBS a ranging response message including CLC start time information that set by the TBS.

The CLC start time information is able to indicate a Super-Frame Number (SFN) of a CLC start time. In this case, the CLC start time information may further comprise a CLC identifier identifying a class of the CLC mode and a start frame index (SFI) indicating a frame index of the CLC start time.

The CLC start time information is set by the second base station based on CLC information obtained from the first base station via backbone network.

The CLC information may comprise a CLC active cycle and a CLC active interval.

The first BS is a serving BS when the MS enters the CLC mode, and the second BS is a target BS for handover of the MS.

The CLC mode of the MS may be one of a type I CLC mode or a type II CLC mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates methods for readjusting a CLC active interval according to embodiments of the present invention.

FIG. 6 illustrates methods for adjusting a CLC active interval in an IEEE 802.16m frame according to embodiments of the present invention.

DETAILED DESCRIPTION OF THE INVENTION

Figure 1:
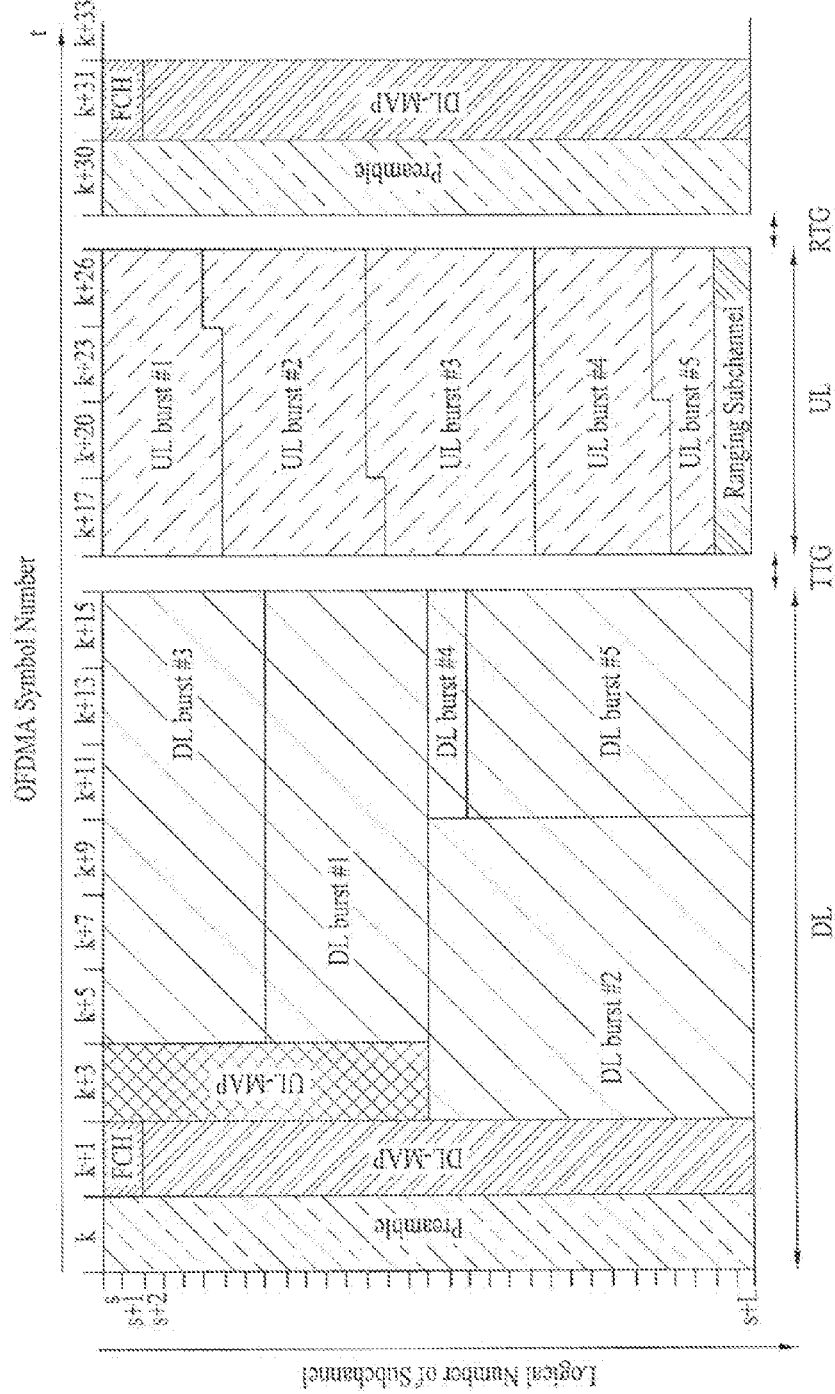
FIG. 1 illustrates a frame structure used in a broadband wireless access system such as an Institute of Electrical and Electronics Engineers (IEEE) 802.16e system.

Embodiments of the present invention provide various methods and apparatuses for reducing interference between systems, when one or more wireless access systems are co-located.

The embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In the embodiments of the present invention, a description is made of a data transmission and reception relationship between a Base Station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS), etc.

The term 'MS' may be replaced with the term 'User Equipment (UE)', 'Subscriber Station (SS)', 'Mobile Subscriber Station (MSS)', 'terminal', 'mobile terminal', 'Advanced Mobile Station (AMS)', etc.

A transmitter means a fixed and/or mobile node that transmits voice or data service and a receiver means a fixed and/or mobile node that receives voice or data service. Hence, an MS may be a transmitter and a BS may be a receiver, on an uplink. Likewise, the MS may be a receiver and the BS may be a transmitter, on a downlink.

The embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents.

All terminologies used herein may be supported by at least one of P802.16e-2004, P802.16e-2005, P802.16Rev2, and P802.16m documents which are the standards of IEEE 802.16. All terms used for the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used for the embodiments of the present invention are provided to help the understanding of the present invention. These specific terms may be replaced with other terms within the scope and spirit of the present invention.

The present invention is applicable to a network situation in which one of an International Mobile Telecommunication (IMT)-Advanced system, an IEEE 802.16m system, and a non-IEEE 802.16 system such as a Wireless-Fidelity (Wi-Fi) system, IEEE 802.11, IEEE 802.15.1, etc.

Figure 2:
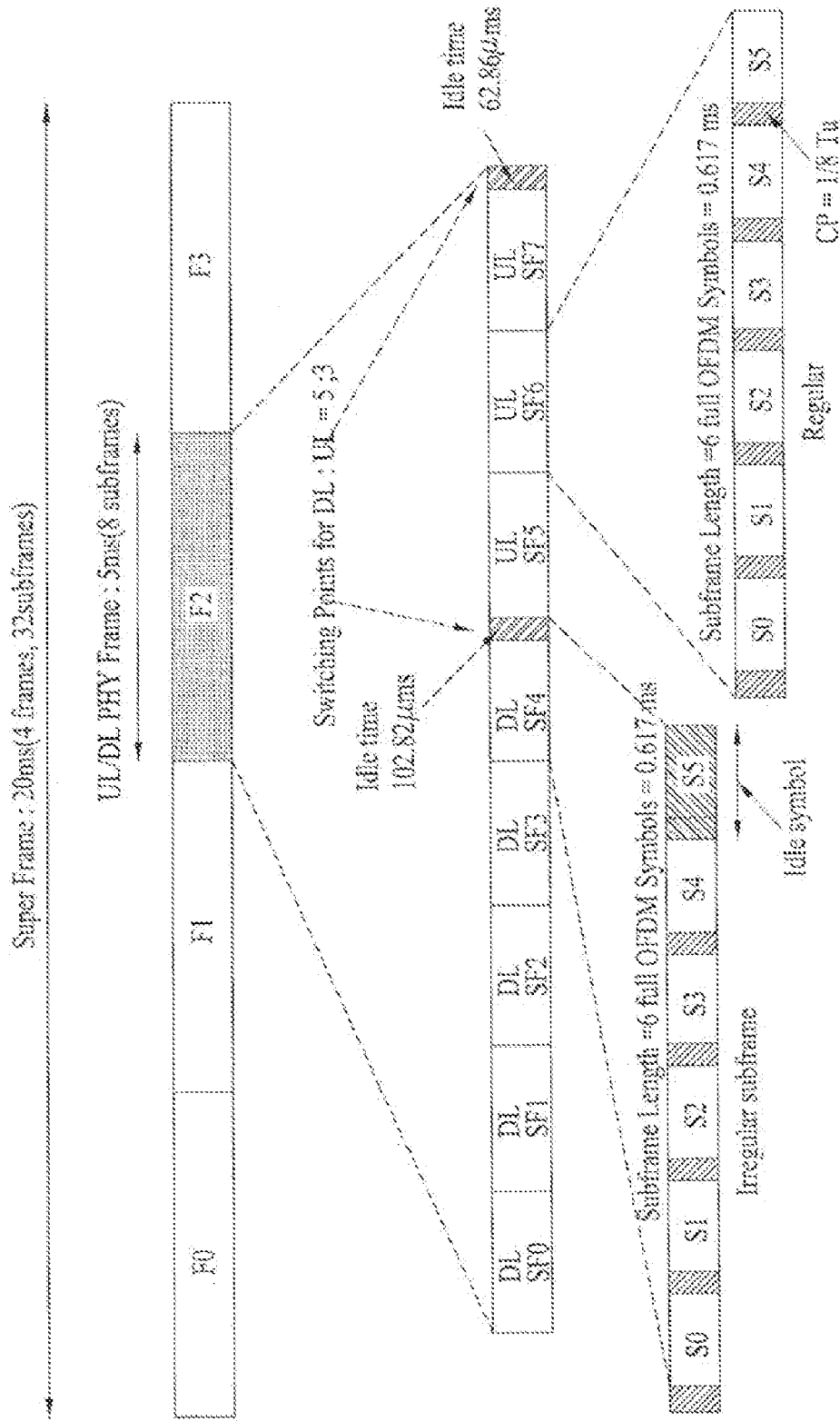
FIG. 2 illustrates one of frame structures available to an IEEE 802.16m system.

FIG. 2 illustrates one of frame structures available to an IEEE 802.16m system.

Referring to FIG. 2, one superframe may be 20 ms long. Each 20-ms superframe is divided into four 5-ms frames. Each frame may include 8 subframes, each subframe being allocated for DL or UL transmission.

A subframe may include 6 OFMDA symbols, each OFDMA symbol being 617 µs long. A SuperFrame Header (SFH) is transmitted every 20 ms, including a Primary Broadcast CHannel (P-BCH) and a Secondary Broadcast CHannel (S-BCH).

The P-BCH may deliver system information common to the entire network and the S-BCH may carry cell-specific system information.

The frame structure illustrated in FIG. 2 has DL subframes and UL subframes at 5:3. Specific parameters related to the 5:3 frame structure may be referred to FIG. 2. Yet, the DL:UL ratio is not limited to 5:3 in embodiments of the present invention. Depending on system situations or user requirements, the DL:UL ratio may be 2:6, 4:4 or 6:2.

Figure 3:
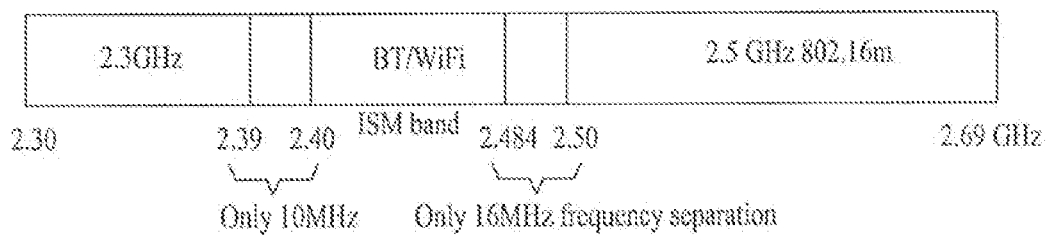
FIG. 3 illustrates a frequency spectrum when a Wireless Fidelity (Wi-Fi) system and the IEEE 802.16m system are co-located in a Co-Located Coexistence (CLC) environment.

FIG. 3 illustrates a frequency spectrum when a Wi-Fi system and an IEEE 802.16m system are co-located in a Co-Located Coexistence (CLC) environment.

Referring to FIG. 3, a frequency band for wireless communication ranges from 2.30 to 2.69 GHz. Bluetooth (BT) and the Wi-Fi system operate in 2.4 to 2.484 GHz, and the IEEE 802.16m system operates in 2.50 to 2.69 GHz. The frequency band of BT and the Wi-Fi system is near to that of the IEEE 802.16m system, only with a gap of about 16 MHz.

Accordingly, when a plurality of radio technologies available to an MS are implemented independently or simultaneously, severe interference may occur. For example, the IEEE 802.16m system and the BT/Wi-Fi system operate independently of each other. Thus when the MS receives data from the IEEE 802.16m system, transmission of BT data packets should be blocked.

Co-Located Coexistence (CLC) Mode Negotiation Procedure

Figure 4:
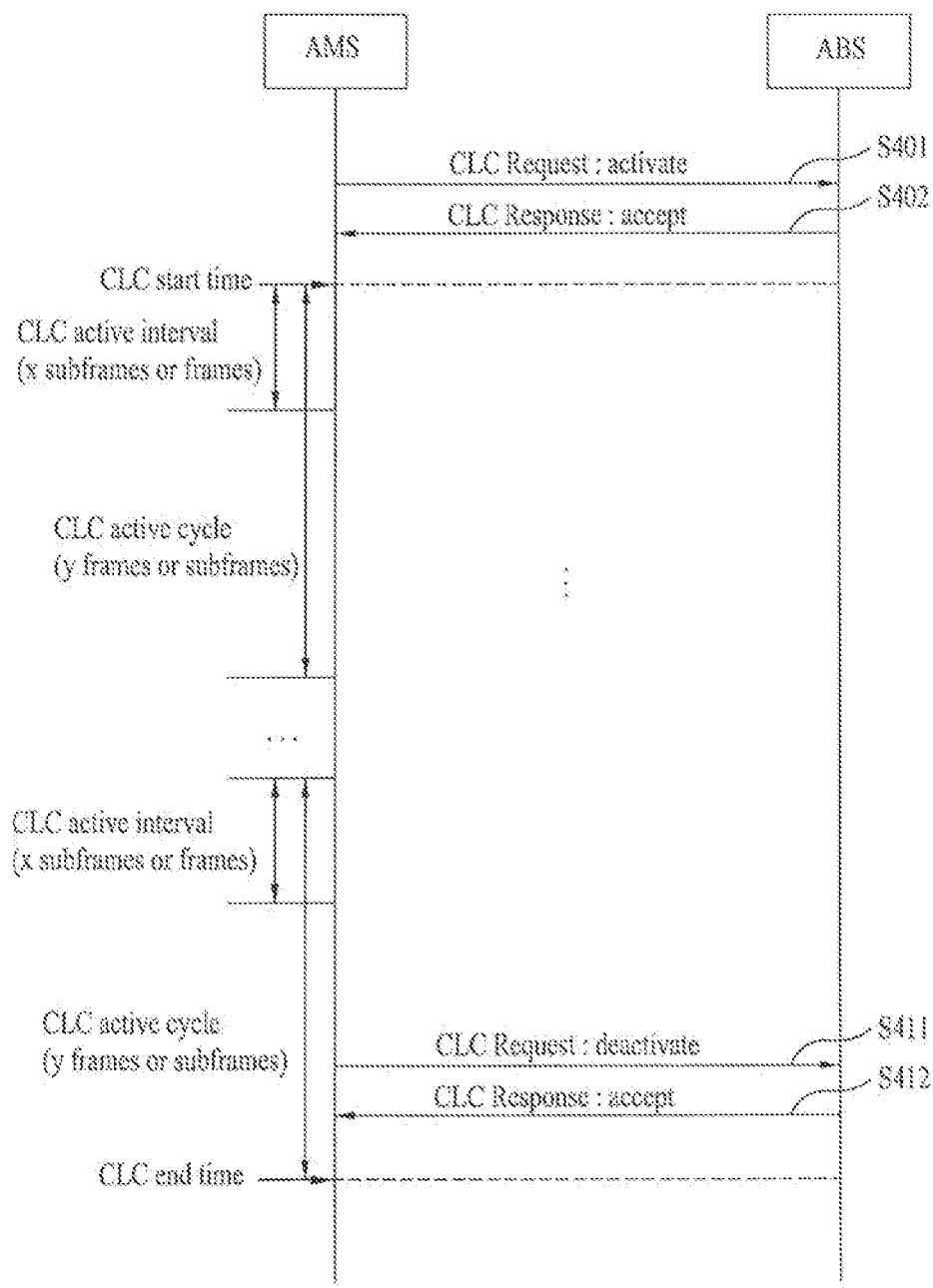
FIG. 4 is a diagram illustrating a signal flow for an exemplary CLC mode negotiation procedure, which is applicable to embodiments of the present invention.

FIG. 4 is a diagram illustrating a signal flow for an exemplary CLC mode negotiation procedure, which is applicable to embodiments of the present invention.

There are three types of CLC classes applicable to embodiments of the present invention. The CLC classes differ from each other in terms of the time unit of CLC start time, CLC active cycle, and/or CLC active interval.

TABLE 1

| CLC class/type | CLC active cycle | CLC active interval | CLC start time |
|---|---|---|---|
| Type I | microsecond | subframe | subframe |
| Type II | frame | subframe | frame |
| Type III | not applicable | subframe | superframe |

Referring to Table 1, the types of CLC classes may be distinguished by CLC factors. The CLC factors may include CLC start time, CLC active cycle, and CLC active interval. A CLC start time is a start time each of CLC classes, a CLC active cycle is the time interval of an active pattern of a CLC class repetition, and a CLC active interval is the time duration of a CLC class designated for co-located non-802.16 radio activities.

Preferably, an AMS determines a CLC active interval and a CLC active cycle based on activities of a co-located non-802.16 wireless access system. It is preferred that an AMS determines the CLC start time of Type I CLC Class and an ABS determines the CLC start times of Type II CLC class and Type III CLC class.

Referring to FIG. 4. an AMS may transmit to an ABS a CLC Request (CLC-REQ) message that includes a request action field indicating activation in order to operate in CLC mode or deactivation of the corresponding CLC class in step S401.

The CLC-REQ message may further include AMS-preferred CLC information. The CLC information may include one or more of a CLC type field indicating an intended CLC class, a CLC start time field, a CLC active cycle field, and a CLC active interval field.

The ABS may reply to the AMS with a CLC-RSP message in step S402. Specifically, the ABS may accept the CLC request and allocate a CLC Identifier (ID) indicating the type of a CLC class to the AMS. Also, the ABS may transmit information about the start frame of the CLC mode, adjusted based on the CLC information (e.g. the CLC start time) received from the AMS by the CLC-RSP message.

The AMS may communicate with a co-located wireless system during a CLC active interval within a CLC active cycle and communicate with the IEEE 802.16m system during the rest of the CLC active cycle. In this manner, the AMS may repeat the CLC class in every CLC active cycle. That is, upon receipt of the CLC-RSP message, the AMS may operate in the CLC mode until the initiated CLC mode is deactivated.

When the AMS intends to terminate the CLC mode, it may transmit a CLC-REQ message including a request action field that indicates deactivation in step S411. The CLC-REQ message may include a CLC ID that identifies the CLC class to be terminated.

Upon receipt of the CLC-REQ message including the request action field indicating deactivation, the ABS may check the CLC ID and then terminate the CLC mode. Also, the ABS may transmit a CLC-RSP message to the AMS so that the AMS terminates the CLC mode in step S412.

The CLC-REQ message and the CLC-RSP message each may be one of Medium Access Control (MAC) messages used in a MAC layer in embodiments of the present invention.

In accordance with the embodiments of the present invention, the AMS and the ABS should determine a CLC start time appropriately so that the CLC start time does not coincide with an SFH. A detailed description will be made of operations of an AMS and an ABS when a CLC active interval overlaps with a reception period of an SFH.

CLC Active Interval Adjustment Method

A detailed description will be made of methods for adjusting a CLC active cycle.

FIG. 5 illustrates methods for readjusting a CLC active interval according to embodiment of the present inventions.

FIG. 5(a) illustrates a method for adjusting a CLC active interval by an ABS. Referring to FIG. 5(a), an AMS may request initiation of CLC mode to an ABS by transmitting a CLC-REQ message as in step S401 of FIG. 4, in step S511.

The ABS may check CLC information included in the CLC-REQ message and determine whether a transmission time of an SFH coincides with a CLC active interval (preferably, a CLC start time) requested by the AMS. If the SFH transmission time coincides with the AMS-requested CLC active interval, the ABS may adjust the CLC active interval in step S512.

In step S513, the ABS may transmit a CLC-RSP message including adjusted CLC information to the AMS and the AMS may then operate in the CLC mode based on the adjusted CLC information.

FIG. 5(b) illustrates a method for adjusting a CLC active interval by an AMS. Referring to FIG. 5(b), the AMS may receive an SFH periodically (e.g. every 20 ms) from an ABS in step S521.

When the AMS intends to enter CLC mode, it may determine whether a preferred CLC active interval coincides with a transmission time of an SFH because it receives the SFH from the ABS. Therefore, the AMS may adjust the CLC active interval according to the transmission time of the periodic SFH in step S522.

In step S523, the AMS may transmit a CLC-REQ message with CLC information that includes a CLC active interval field set to an adjusted value to the ABS.

The ABS may be aware of an AMS-requested CLC class from the received CLC-REQ message. Thus the ABS may accept the CLC mode initiation request by transmitting a CLC-RSP message to the AMS to thereby operate with the AMS in the CLC mode in step S524.

How the ABS and/or the AMS adjust a CLC active interval in steps S512 and S522 will be described below in detail.

FIG. 6 illustrates a method for adjusting a CLC active interval on an IEEE 802.16m frame according to embodiments of the present invention.

The embodiments of the present invention illustrated in FIGS. 6(a), 6(b) and 6(c) are based on the assumption of a frame with a DL:UL ratio of 4:4, while the embodiments of the present invention are implementable with any other DL:UL ratio.

FIG. 6(a) illustrates a method for adjusting a CLC active interval on a of frame basis. Referring to FIG. 6(a), if the start frame of a CLC active interval that an AMS has requested or will request carries an SFH, the AMS and/or an ABS may adjust the CLC active interval to the next frame. In other words, the start frame of the CLC active interval may be adjusted to the frame following the frame carrying the SFH.

If a CLC active interval is specified in units of frames, the AMS and/or the ABS may control the CLC active interval so that a subframe which carries an SFH and which coincides with the CLC active interval is not used for multi-radio coexistence mode. In this case, the AMS and/or the ABS may operate in the CLC mode in the manner that was initially negotiated during the rest of the CLC active interval except the subframe overlapped with the SFH.

FIG. 6(b) illustrates a method for adjusting a CLC active interval on a subframe basis. Referring to FIG. 6(b), if the start subframe of a CLC active interval that has been requested or will be requested by an AMS coincides with a subframe carrying an SFH, the AMS and/or an ABS may adjust the CLC start time to the next subframe. That is, the start subframe of the CLC active cycle may be adjusted to the subframe following the subframe carrying the SFH.

If a CLC active interval is given in units of subframes, the CLC active interval is adjusted as follows. If a subframe carrying an SFH coincides with a CLC start time, the AMS and/or the ABS may adjust the start time of the CLC active interval to the next subframe to the subframe carrying the SFH and operate during the rest of the CLC active interval in the manner initially negotiated between the AMS and the ABS.

Alternatively or additionally, the AMS and/or the ABS may shift the whole time period from the overlapped part between the CLC active interval and the subframe carrying the SFH to the rest of the CLC active interval by one subframe. Each time a CLC active cycle and a CLC active interval negotiated by the AMS and/or the ABS are overlapped with a subframe carrying an SFH, the whole CLC active cycle and CLC active interval may be delayed by one subframe.

FIG. 6(c) illustrates a method for readjusting a CLC active interval by shifting a CLC active interval by one or more frames (or two or more frames) by an ABS and/or an AMS, when an SFH is transmitted during the CLC active interval.

If the CLC active interval lasts two or more subframes, the AMS and/or the ABS may control a subframe carrying an SFH within the CLC active interval not to be used for multi-radio coexistence mode. This implies that the ABS does not allocate data to the AMS in the subframe.

When a CLC active interval is two or more subframes long and a subframe of the CLC active interval coincides with an SFH transmission period, the AMS and/or the ABS adjusts the overlapped CLC active interval to start in the next subframe to the subframe carrying the SFH, and operates during the rest of the CLC active interval in the manner that was initially negotiated (active interval ①) or operates by shifting the whole CLC active interval by as much as overlapped with the SFH (active interval ②).

Method for Maintaining CLC Mode after Handover

In accordance with the embodiments of the present invention, if a CLC-mode AMS is to perform a handover, it may locally suspend all current active CLC-mode operations (e.g. Type 1 CLC Class, Type II CLC Class, and/or Type III CLC Class). In addition, the AMS may locally suspend CLC mode to perform a handover procedure with a Target ABS (T-ABS), after transmitting an Advanced Air Interface Handover Request (AAI_HO-REQ) message to a Serving ABS (S-ABS) or receiving an Advanced Air Interface Handover Command (AAI_HO-CMD) message from the S-ABS.

More specifically, after transmitting the AAI_HO-REQ message, the AMS receives the AAI_HO-CMD message. The AMS suspends a CLC-mode operation with the S-ABS at a disconnection time indicated by the AAI_HO-CMD message. Then, the AMS may reactivate the CLC mode with a new serving base station (i.e. target base station) at a disconnect time is terminated.

Or after receiving the AAI_HO-CMD message, the AMS decides on a handover and transmits an Advanced Air Interface Handover Indication (AAI_HO-IND) message with code 3 to the S-ABS. The code 3 (e.g. 0b10) indicates that the AMS is unable to stay connected to the S-ABS until expiration of a disconnection time. Then, the AMS may terminate the on-going CLC-mode operation.

In case of Type I CLC Class, the AMS may maintain existing CLC active cycle and CLC active interval parameters after a handover. A CLC start time may be set to the start of a next CLC active cycle.

In case of Type II CLC Class, a new S-ABS may set a SuperFrame Number (SFN) corresponding to a CLC start time to a value requested by the AMS in a request message such as a CLC-REQ message or a Ranging Request (RNG-REQ) message. In addition, the new S-ABS (i.e. TBS) may set a Start Frame Index (SFI) of the CLC start time to a value different from a value requested by the AMS in the CLC-REQ message. If the handover is canceled, the AMS and the S-ABS may reactivate the suspended CLC class automatically. The above description is applicable to FIGS. 7 to 10, which will be described below.

A description will be made of various methods for maintaining an existing CLC mode even after a handover from an S-ABS to a T-ABS in a CLC-mode AMS.

In FIGS. 7 to 10, CLC start time information transmitted by the T-ABS may be based on information received from the S-ABS or may be set by the T-ABS on its own without receiving associated information from the S-ABS.

In Type II CLC Class, for instance, the T-ABS may transmit start time information adjusted by the T-ABS to the AMS, other than information requested by the AMS or information received from the S-ABS. In Type I CLC Class, the T-ABS may transmit the same start time information as requested by the AMS or as start time information received from the S-ABS to the AMS.

If the T-ABS shares a CLC context with the S-ABS via backbone network, for example, during a coordinated handover, the T-ABS determines a next CLC cycle as the start time after network reentry and transmits the CLC start information to the AMS by an AAI_RNG-RSP message.

Figure 7:
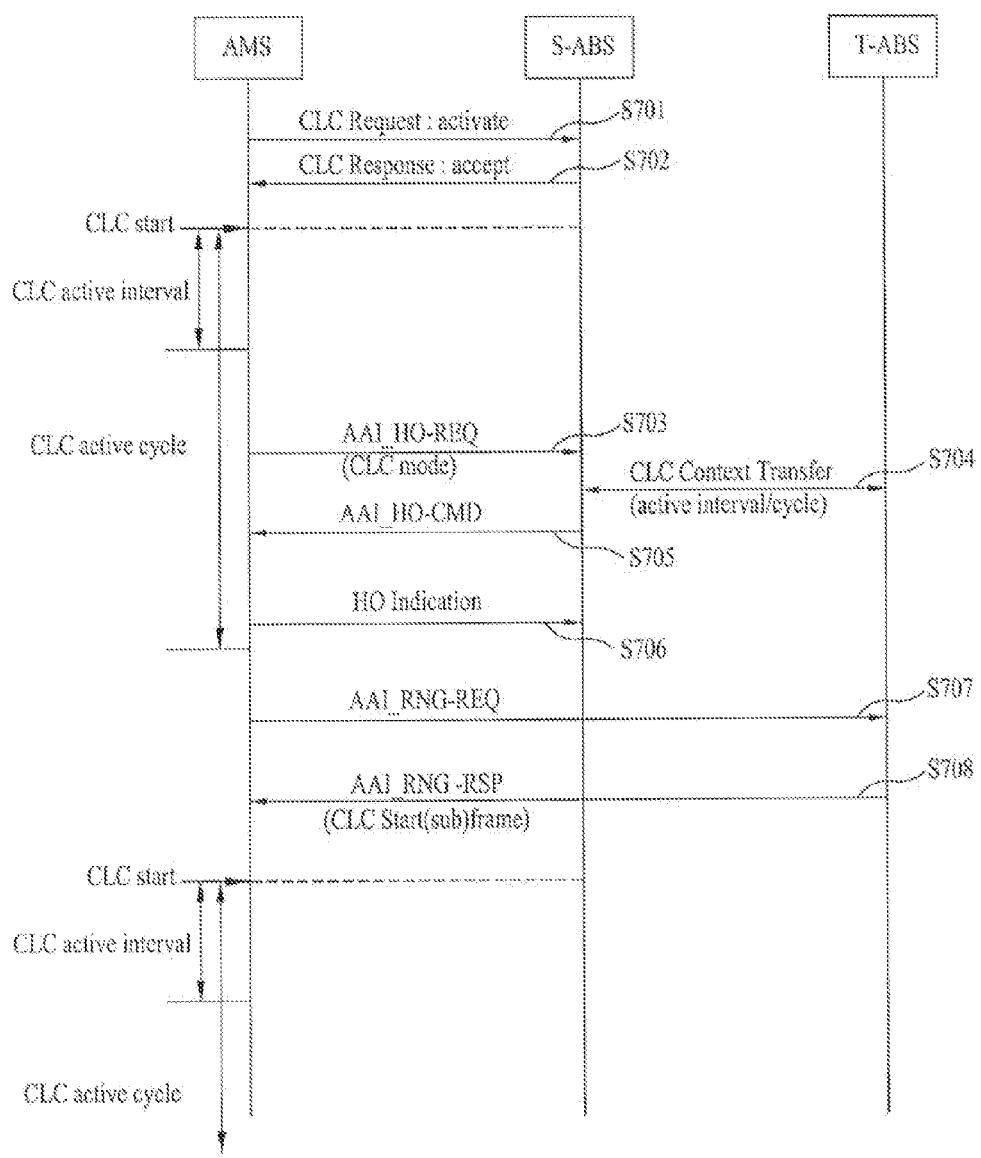
FIG. 7 is a diagram illustrating a signal flow for a method for negotiating CLC mode during network reentry for handover according to an embodiment of the present invention.

FIG. 7 is a diagram illustrating a signal flow for a method for negotiating CLC mode during network reentry for handover according to an embodiment of the present invention.

Steps S701 and S702 are performed in the same manner as steps S401 and S402 of FIG. 4 and thus their description may be referred to FIG. 4. In this embodiment, an AMS is operating in CLC mode according to CLC information negotiated with an S-ABS, such as a CLC active cycle, a CLC active interval, and a CLC start time. For various reasons, the AMS and/or the S-ABS may initiate a handover, respectively.

When a predefined handover trigger condition is satisfied, the AMS may transmit an AAI_HO-REQ message to the S-ABS during a time interval other than the CLC active interval in the CLC cycle in step S703. The AMS may include a CLC mode maintain indicator indicating a CLC factor to be maintained in the AAI_HO-REQ message. Herein, it is assumed that the CLC mode maintain indicator indicates the CLC active cycle and the CLC active interval except the CLC start time.

The S-ABS may share a CLC context (i.e. CLC factors) with a T-ABS by transmitting the CLC information negotiated with the AMS (e.g. the CLC active interval and/or the CLC active cycle) to the T-ABS in step S704.

Even though the CLC mode maintain indicator is not included in the AAI_HO-REQ message transmitted in step S703, if the AMS operates in the CLC mode during the handover, the S-ABS may share the CLC context with the T-ABS.

In step S704, the S-ABS may transmit AMS information to the T-ABS via backbone network. The AMS information may include a MAC address and/or AMS context of the AMS.

In addition, the T-ABS may transmit to the S-ABS handover information including at least one of a dedicated ranging code, a ranging opportunity parameter, and an action time parameter for use in network reentry of the AMS to the T-ABS, over a backbone network.

The S-ABS may transmit an AAI_HO-CMD message including handover information to the AMS as a response to the AAI_HO-REQ message in step S705.

The AMS may optionally transmit an AAI_HO-IND message to the S-ABS, when it intends to perform a handover in step S706.

To attempt network reentry to the T-ABS being a new S-ABS in a handover procedure, the AMS may transmit an AAI_RNG-REQ message in step S707.

The T-ABS may transmit to the AMS an AAI_RNG-RSP message including CLC start time information (e.g. an SFN and an SFI), for a CLC mode operation in step S708.

Therefore, the AMS may initiate the CLC mode with the new S-ABS immediately after the handover to the T-ABS (i.e. the new S-ABS), using the CLC start time information included in the AAI_RNG-RSP message. That is, the AMS reactivates the CLC mode at the beginning of the next CLC active cycle based on the CLC start time information.

In this embodiment, the T-ABS transmits CLC time information adjusted by the T-ABS or received from the S-ABS to the AMS by the AAI_RNG-RSP message. However, the S-ABS and the T-ABS have already shared the CLC context (e.g. the CLC active cycle and the CLC active interval) in step S704.

Therefore, according to another aspect of this embodiment, the T-ABS may adjust the CLC start time used by the AMS and notify the S-ABS of the adjusted CLC start time in step S704. This means that the CLC context is not simply shared, but the CLC context is negotiated and thus a CLC context that the T-ABS can provide may be transmitted to the S-ABS.

In this case, the S-ABS may notify the AMS of the adjusted CLC start time information by the AAI_HO-CMD message. Thus the AMS may operate with the T-ABS in the CLC mode without exchanging CLC information during network reentry to the T-ABS.

Figure 8:
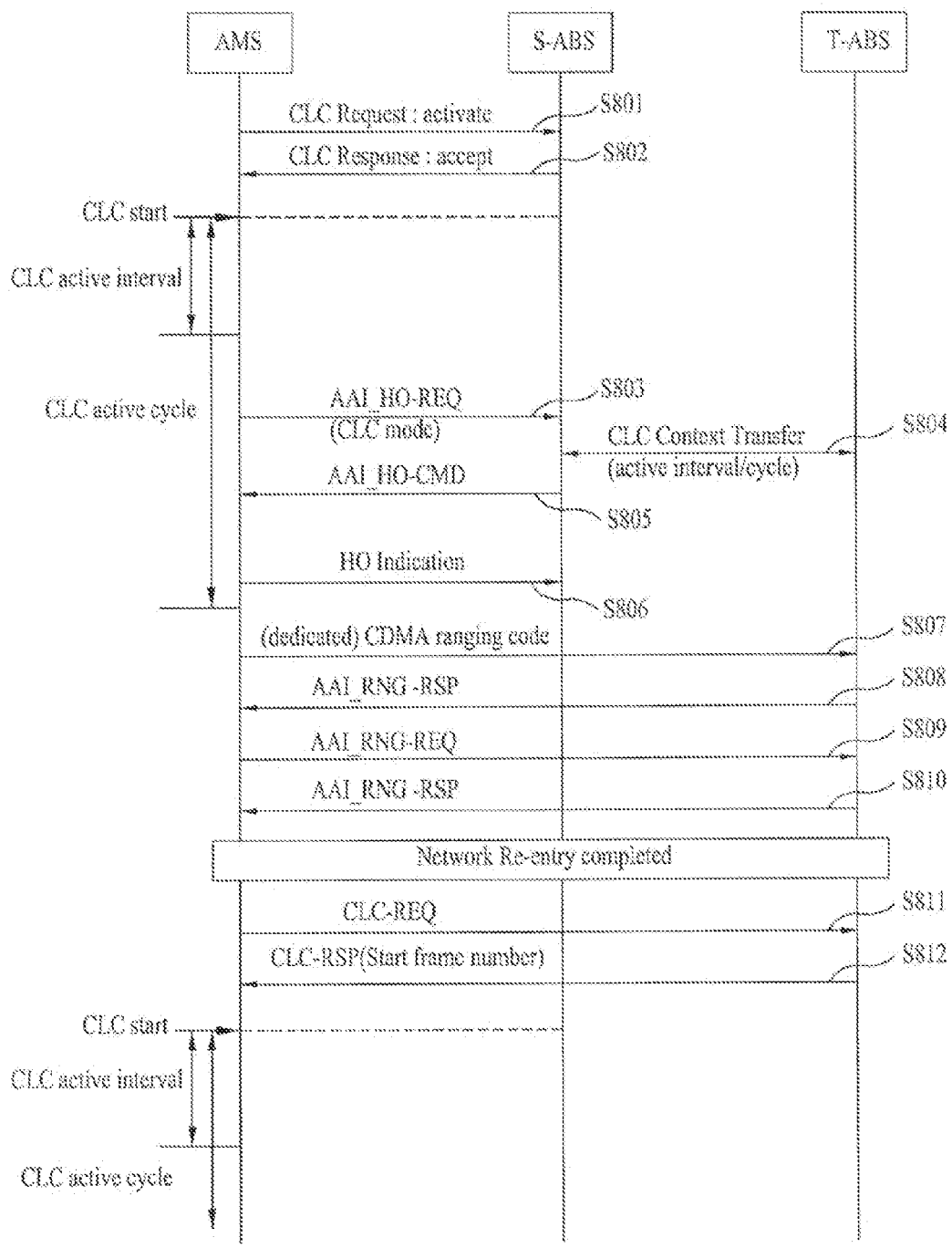
FIG. 8 is a diagram illustrating a signal flow for a method for negotiating CLC mode during network reentry for handover according to another embodiment of the present invention.

FIG. 8 is a diagram illustrating a signal flow for a method for negotiating CLC mode during network reentry for handover according to another embodiment of the present invention.

Steps S801 to S806 are performed in the same manner as steps S701 to S706 of FIG. 7. Thus a description of steps S801 to S806 is not provided herein.

An AMS may perform a network reentry procedure with a T-ABS during a handover. That is, the AMS may perform network reentry to the T-ABS based on handover information acquired in step S805.

In step S807, the AMS may transmit a dedicated Code Division Multiple Access (CDMA) ranging code to the T-ABS, for the network reentry.

Upon receipt of the dedicated CDMA ranging code, the T-ABS transmits to the AMS an AAI_RNG-RSP message including UL radio resource allocation information required for handover ranging in step S808.

The AMS then transmits an AAI_RNG-REQ message in the allocated UL radio resources to the T-ABS in step S809 and the T-ABS transmits an AAI_RNG-RSP message to the AMS in step S810. Thus the AMS and the T-ABS may share physical resources between them and the network reentry procedure may be completed.

The AMS, which has been connected to the T-ABS by the network reentry, may transmit a CLC-REQ message to the T-ABS being a new S-ABS in order to initiate CLC mode in step S811.

The CLC-REQ message may include CLC start time information requested by the AMS for the CLC-mode operation. The CLC start time information may specify the start SFN and SFI of the CLC mode.

The new S-ABS (i.e. the T-ABS) may adjust the AMS-requested CLC start time information, when needed. If the new S-ABS can support the AMS-requested CLC start time information, it does not need to adjust the requested CLC start time information.

However, if the new S-ABS cannot support the AMS-requested CLC start time information, it may adjust the CLC start time information according to a method illustrated in FIG. 5 or 6. Then the AMS may initiate the CLC mode based on the CLC start time information adjusted by the new S-ABS.

In the case where a CLC context is not shared between ABSs, for example, during an uncoordinated handover, the AMS may operate as follows. The AMS may request initiation of CLC mode by transmitting information about a CLC active cycle, a CLC active interval, and a CLC start time to the T-ABS in step S811. On the other hand, if the CLC context is shared between the S-ABS and the T-ABS, MAC messages used in steps S811 and S812 may be replaced with AAI_RNG-REQ and AAI_RNG-RSP, respectively.

Figure 9:
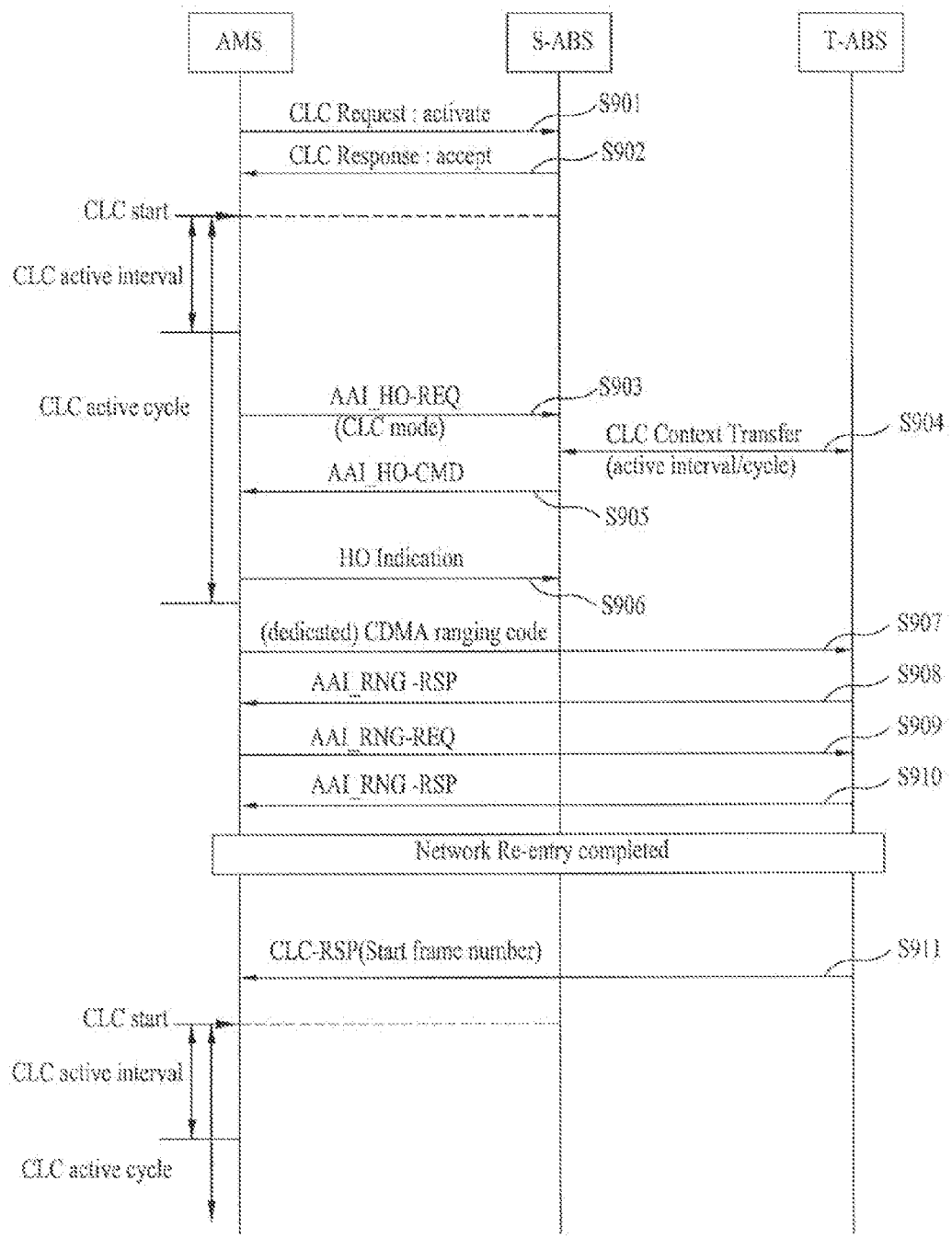
FIG. 9 is a diagram illustrating a signal flow for a method for negotiating CLC mode during network reentry for handover according to another embodiment of the present invention.

FIG. 9 is a diagram illustrating a signal flow for a method for negotiating CLC mode during network reentry for handover according to another embodiment of the present invention.

Steps S901 to S910 are performed in the same manner as steps S801 to S810 of FIG. 8. To avoid a redundant description, a description of steps S901 to S910 is not provided herein.

Compared to the embodiment illustrated in FIG. 8, FIG. 9 describes an embodiment of the present invention in which a new S-ABS (i.e. a T-ABS) transmits an unsolicited CLC-RSP message. An S-ABS has already shared a CLC context of the AMS with the T-ABS in step S904. Therefore, when the AMS performs a handover, the new S-ABS may transmit a CLC-RSP message including adjusted CLC start time information (e.g. an SFN and an SFI) to the AMS without solicitation from the AMS in step S911.

Upon receipt of the CLC-RSP message including the adjusted CLC start time information, the AMS may perform the CLC mode with the new S-ABS using the adjusted CLC start time information.

Figure 10:
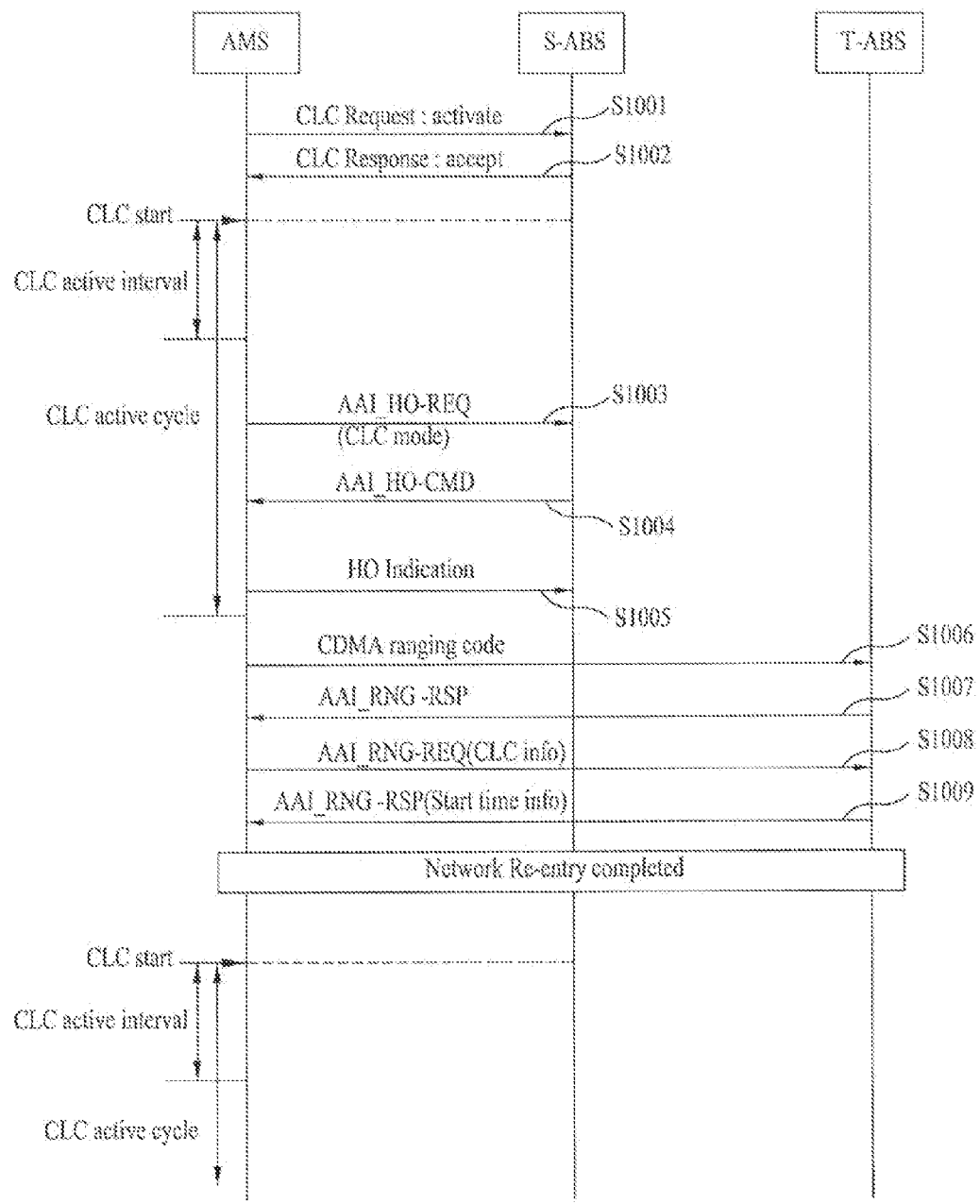
FIG. 10 is a diagram illustrating a signal flow for a method for negotiating CLC mode during network reentry for handover according to a further embodiment of the present invention.

FIG. 10 is a diagram illustrating a signal flow for a method for negotiating CLC mode during network reentry for handover according to a further embodiment of the present invention.

Steps S1001, S1002 and S1003 are performed in the same manner as steps S5801, S802 and S803 of FIG. 8. To avoid a redundant description, a description of steps S1001, S1002 and S1003 is referred to the description of FIG. 8.

Referring to FIG. 10, an S-ABS may transmit to an AMS an AAI_HO-CMD message along with an acknowledgement for a CLC mode maintain request received from the AMS in step S1004. The AAI_HO-CMD message may include the acknowledgment or the AAI_HO-CMD message may be transmitted separately from the acknowledgment.

The illustrated case of FIG. 10 is based on the assumption that a CLC context is not shared between a T-ABS and the S-ABS for many reasons. For example, although the S-ABS transmits handover information about a plurality of candidate ABSs to the AMS, the AMS may not prefer any of the candidate ABSs. Or the AMS may fail to perform a handover to a candidate ABS indicated by the S-ABS. In this case, CLC information about the AMS may not be shared between the T-ABS and the S-ABS.

The AMS may acquire UL synchronization with the T-ABS by receiving a preamble or an SFH periodically transmitted from the T-ABS and transmit a CDMA ranging code to the T-ABS in an earliest ranging opportunity in step S1006.

In step S1007, the T-ABS transmits an AAI_RNG-RSP message including UL radio resource allocation information to the AMS, for use in handover ranging.

The AMS may transmit an AAI_RNG-REQ message including CLC information that the AMS wants to maintain in the allocated UL radio resources to the T-ABS.

If the AMS transmitted a CLC mode maintain indicator in step S1003, or if a CLC context is shared between the S-ABS and the T-ABS without solicitation from the handover AMS, UL resources may be allocated for an AAI_RNG-REQ message to the AMS, taking into account transmission of CLC mode information in the AAI_RNG-REQ message.

The CLC information may include parameters such as a CLC active cycle, a CLC active interval, and a CLC start time. Besides the CLC information, the AMS may further transmit a CLC mode maintain indicator indicating CLC information to be maintained to the T-ABS by the AAI_RNG-REQ message in step S1008.

The CLC mode maintain indicator may indicate a CLC active cycle and a CLC active interval. In another approach, the AMS may transmit its intended CLC start time information in a CLC-REQ message in step S1008. The CLC start time information may include the start SFN and SFI of the CLC mode.

The T-ABS may adjust CLC information based on the CLC information and/or the CLC mode maintain indicator received in step S1008 in a method illustrated in FIG. 5 or FIG. 6. For instance, the T-ABS may transmit CLC start time information (e.g. an SFN and an SFI) adjusted for the CLC mode to the AMS by an AAI_RNG-RSP message in step S1009.

If the AMS transmitted a CLC mode maintain indicator to the S-ABS in step S1003 or a CLC context is shared between the S-ABS and the T-ABS, the T-ABS may allocate UL resources for transmission of an AAI_RNG-REQ message including CLC mode information to the AMS without solicitation of the AMS.

Figure 11:
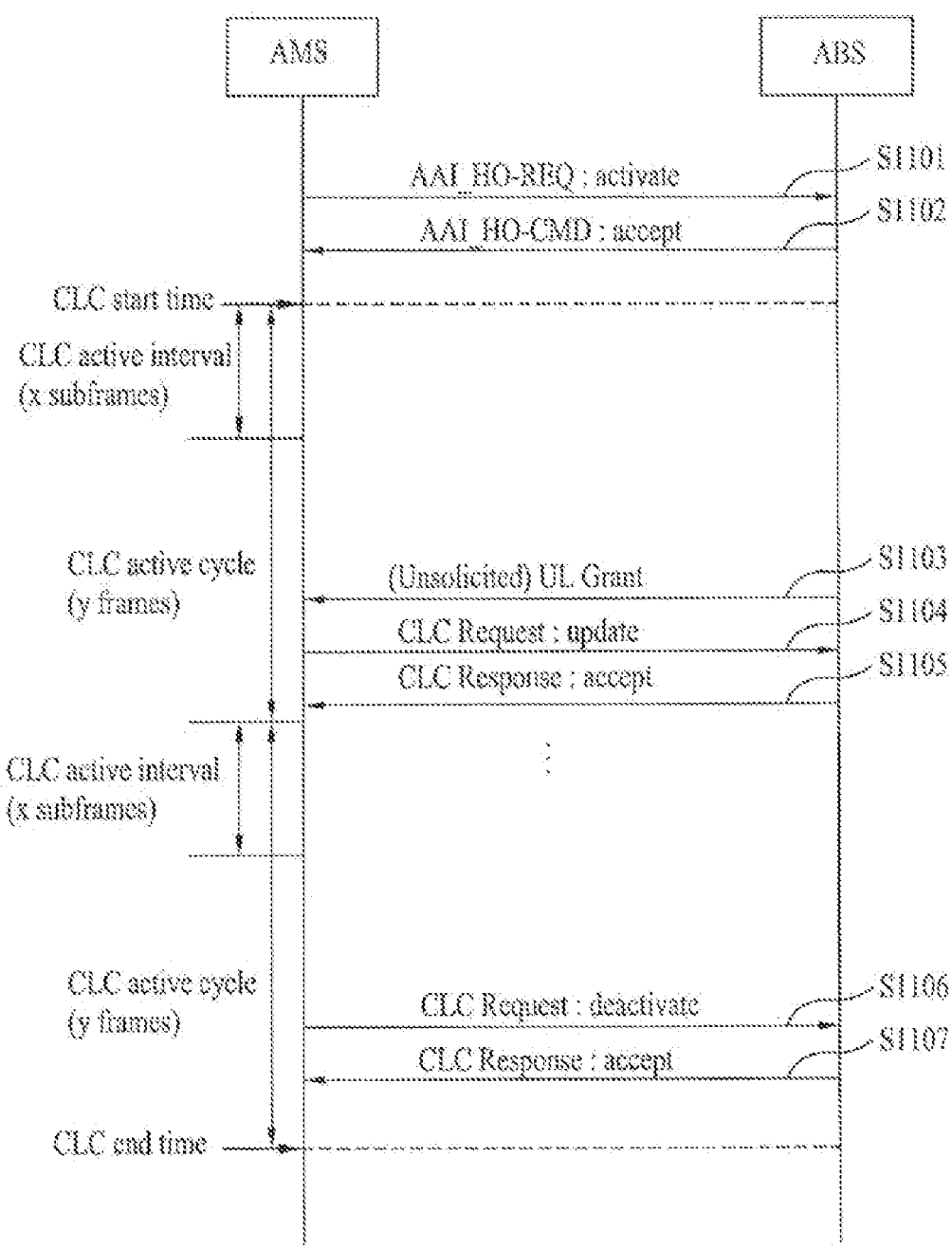
FIG. 11 is a diagram illustrating a signal flow for a method for changing CLC information according to an embodiment of the present invention.

FIG. 11 is a diagram illustrating a signal flow for a method for changing CLC information according to an embodiment of the present invention.

Steps S1101 and S1102 are performed in the same manner as steps S401 and S402 of FIG. 4. Thus a description of steps S1101 and S1102 is not provided herein. An AMS may enter CLC mode by receiving a CLC-RSP message from an ABS in step S1102.

In this embodiment, the ABS may periodically allocate uplink resources to the AMS, for operation in the CLC mode. Specifically, the ABS may transmit to the AMS an unsolicited UL grant message including information about an allocated specific radio resource area to the CLC-mode AMS in step S1103.

The UL grant message may be transmitted shortly before the start of every CLC active interval. A transmission period of the UL grant may be negotiated during the CLC mode negotiation in steps S1101 and S1102, for example. After the UL grant transmission period is negotiated, the ABS may transmit an unsolicited UL grant message periodically to the AMS.

When the AMS wants to change a CLC factor (e.g. a CLC start time, a CLC active interval and/or a CLC active cycle), it may transmit a CLC-REQ message including reconfigured CLC information to the ABS in step S1104.

The ABS may check the CLC factor of which the change the AMS has requested and operate with the AMS in the CLC mode according to the changed CLC factor. The ABS may transmit a CLC-RSP message accepting the CLC factor change request to the AMS in step S1105.

If a periodic Channel Quality Indicator CHannel (CQICH) was allocated to the AMS, the AMS may need to change a CLC factor. The AMS may transmit a predetermined CQI value to the ABS and the ABS may allocate a UL resource area for transmission of a CLC-REQ message to the AMS by a UL grant message. Or the CQI value may indicate a predetermined CLC factor change period and the AMS may change a CLC factor immediately when the CLC factor change period comes.

If the AMS intends to terminate the CLC mode, it may transmit a CLC-REQ message having an operation code set to deactivation to the ABS in step S1106.

Upon receipt of the CLC-REQ message, the ABS may be aware that the AMS will terminate the CLC mode in step S1106. Accordingly, the ABS may end the CLC mode of the AMS by transmitting a CLC-RSP message in step S1107.

Figure 12:
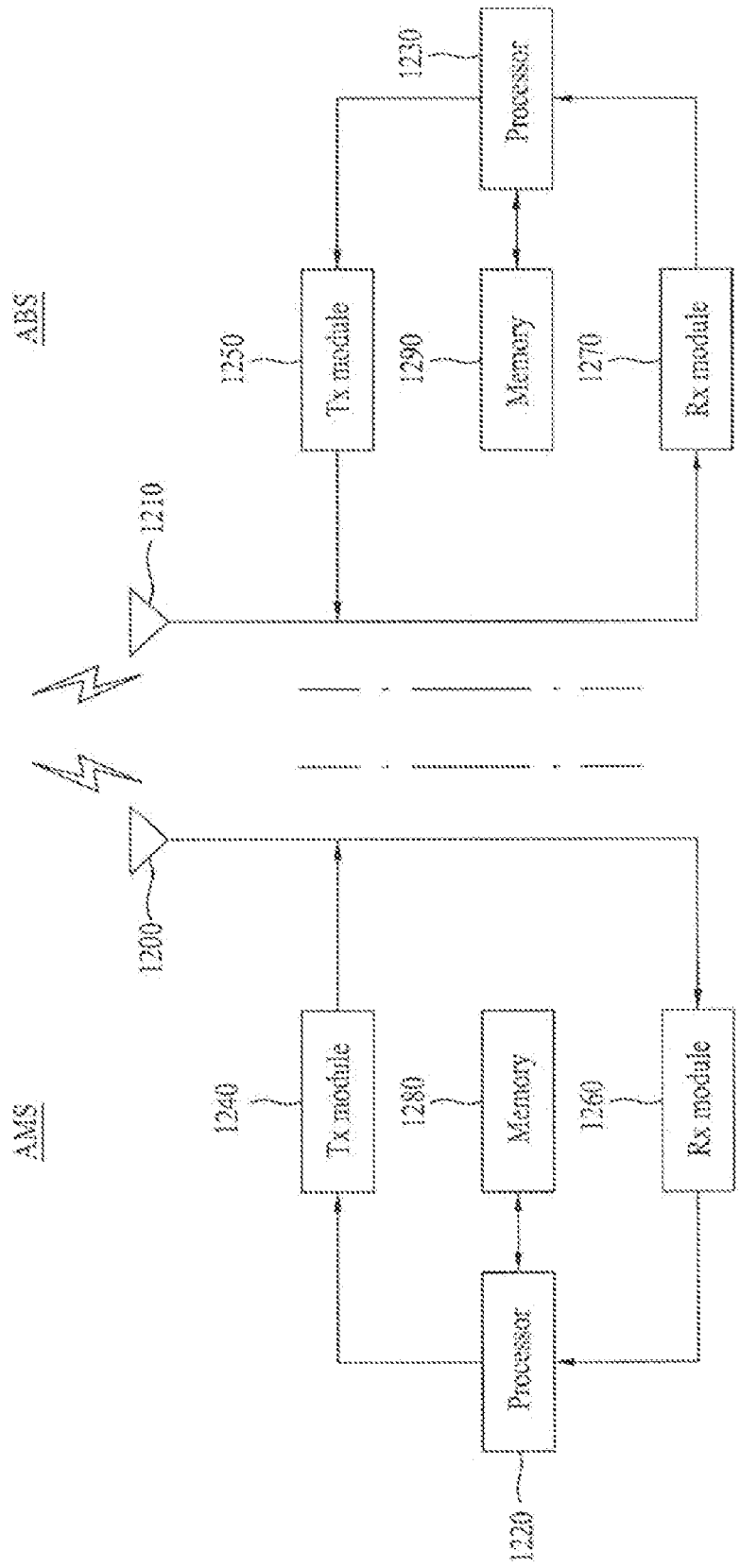
FIG. 12 is a block diagram of a Mobile Station (MS) and a Base Station (BS) for implementing the embodiments of the present invention illustrated in FIGS. 2 to 11, according to an embodiment of the present invention.

FIG. 12 is a block diagram of an ABS and an AMS for performing the embodiments of the present invention illustrated in FIGS. 2 to 11 according to an embodiment of the present invention.

The AMS operates as a transmitter on the UL and as a receiver on the DL. The ABS operates as a receiver on the UL and as a transmitter on the DL.

Referring to FIG. 12, the AMS and the ABS may include antennas 1200 and 1210 for transmitting and receiving information, data, signals and/or messages, Transmission (Tx) modules 1240 and 1250 for transmitting messages by controlling the antennas 1200 and 1210, Reception (Rx) modules 1260 and 1270 for receiving messages by controlling the antennas 1200 and 1210, memories 1280 and 1290 for temporarily or persistently information related with communications with the ABS and data generated during the operations of processors 1220 and 1230, and the processors 1220 and 1230 for implementing the afore-described embodiments of the present invention.

Especially, the processors 1220 and 1230 each may include a CLC module for supporting a CLC operation described in the embodiments of the present invention. Also, each of the ABS and the ABS may further include a Radio frequency (RF)/Intermediate Frequency (IF) module.

The Tx modules 1240 and 1250 and the Rx modules 1260 and 1270 of the AMS and the ABS may perform packet modulation and demodulation, high-speed packet channel coding, Orthogonal Frequency Division Multiple Access (OFDMA) packet scheduling, Time Division Duplex (TDD) packet scheduling, and/or channel multiplexing, for data transmission and reception.

The processors 1220 and 1230 may perform a control function for an uncoordinated handover according to the present invention, a MAC frame conversion control function based on service characteristics and propagation environments, a real-time control function for high-speed traffic, and/or a real-time modern control function.

The ABS and the AMS described with reference to FIG. 12 are means for implementing the methods described referring to FIGS. 2 to 11. The embodiments of the present invention may be performed using the components and functions of the AMS and the ABS.

The processor 1220 of the AMS includes a handover module for controlling handover and a CLC module for controlling CLC mode. The AMS may perform a handover function through the handover module and a CLC-mode operation through the CLC module.

The processor 1220 may adjust a CLC active interval in the methods illustrated in FIGS. 5 and 6. If the AMS wants to operate in the CLC mode, the processor 1220 includes CLC information in a CLC-REQ message or an RNG-REQ message and controls the Tx module 1240 to transmit the CLC-REQ or RNG-REQ message to an S-ABS through the antenna 1200.

The Rx module 1260 of the AMS may receive a CLC-RSP message and/or an RNG-REQ message from the S-ABS. Then the processor 1220 may store CLC information included in the CLC-RSP message and/or the RNG-REQ message in the memory 1280 and perform a CLC-mode operation based on the CLC information.

The AMS may perform the CLC negotiation procedure, the handover procedure, and the network reentry procedure illustrated in FIGS. 6 to 11 with a T-ABS by use of the processor 1220 including the handover module and the CLC module, and transmit and receive related messages through the Tx and Rx modules 1240 and 1260. The processor 1220 provides control to the CLC module.

The Rx module 1270 of the S-ABS may provide a CLC-REQ message and/or a CLC-RSP message received through the antenna 1210 to the processor 1230. The processor 1230 may store AMS information and CLC information and transmit a handover command message including CLC-related information to the AMS through the Tx module 1250.

The T-ABS may perform the newt reentry procedure described with reference to FIGS. 3 to 8 with the AMS through its Tx and Rx modules. Specifically, the T-ABS may manage a handover procedure through a handover module of its processor and transmit and receive related messages to and from the AMS.

As is apparent from the above description, first of all, an AMS and an ABS can efficiently perform a CLC-mode operation.

An AMS having both a Wi-Fi interface and an IEEE 802.16m interface can reduce interference between Wi-Fi and IEEE 802.16m systems.

When a CLC-mode AMS performs a handover, a T-ABS maintains or adjusts the existing CLC mode. Therefore, the AMS can receive a service efficiently.

In addition, the start time of CLC mode is controlled such that it does not coincide with an SFH. Hence, an AMS and an ABS can efficiently operate in the CLC mode and the AMS can acquire system information stably.

If a CLC-mode AMS performs a handover, CLC information about the AMS is shared between an S-ABS and a candidate ABS (i.e. a T-ABS) and the T-ABS transmits CLC start time information (an SFN, an SFI, etc.) to the AMS. Accordingly, the CLC mode is resumed readily and fast.

When a reception time of an SFH is overlapped with a start frame of a CLC active interval, an ABS reschedules the CLC active interval, thereby ensuring IEEE 802.16m communications. Further, the ABS transmits an unsolicited UL grant message to an AMS in case the AMS wants to change CLC information. Consequently, a CLC parameter can be changed rapidly.

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

Meanwhile, the AMS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, Wideband CDMA (WCDMA), etc.)

Embodiments of the present invention may be achieved by various means, for example, hardware, firmware, software, or a combination thereof.

In a hardware configuration, the methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method for supporting a Co-Located Coexistence (CLC) mode in a Mobile Station (MS), the method comprising:
   transmitting, by the MS which is in the CLC mode, a handover request message to a first Base Station (BS) to initiate a handover process;
   receiving, from the first BS, a handover command message acknowledging the handover request message;
   transmitting, by the MS to a second BS, a ranging request message at network reentry after handover; and
   receiving, from the second BS, a ranging response message comprising CLC start time information that is set by the second BS.

2. The method according to claim 1, wherein:
   the CLC start time information indicates a CLC start time; and
   the CLC start time information comprises a SuperFrame Number (SFN) field indicating a superframe number of the CLC start time and a start frame index (SFI) field indicating a frame index of the CLC start time.

3. The method according to claim 2, wherein the ranging response message further comprises a CLC identifier identifying a class of the CLC mode.

4. The method according to claim 3, wherein the CLC mode is a type I CLC mode or a type II CLC mode.

5. The method according to claim 3, wherein the CLC start time information is set by the second BS based on CLC information obtained from the first BS via a backbone network.

6. The method according to claim 5, wherein the CLC information comprises information of a CLC active cycle and a CLC active interval.

7. The method according to claim 3, wherein:
   the first BS is a serving BS when the MS enters the CLC mode; and
   the second BS is a target BS for handover of the MS.

8. A method for supporting a Co-Located Coexistence (CLC) mode in a first Base Station (BS), comprising:
   obtaining CLC information of a mobile station (MS) from a second BS via a backbone network while the MS performs a handover preparation procedure;
   receiving, from the MS, a ranging request message; and transmitting to the MS, during a network reentry, a ranging response message including CLC start time information set by the first BS based on the CLC information, wherein the MS is in the gRG-CLC mode.

9. The method according to claim 8, wherein the CLC start time information comprises a SuperFrame Number (SFN) field indicating a superframe number of a CLC start time and a start frame index (SFI) field indicating a frame index of the CLC start time.

10. The method according to claim 9, wherein the ranging response message further comprises a CLC identifier identifying a class of the CLC mode.

11. The method according to claim 9, wherein the CLC mode is a type I CLC mode or a type II CLC mode.

12. The method according to claim 9, wherein the CLC information comprises information of a CLC active cycle and a CLC active interval.

13. The method according to claim 9, wherein the first BS is a new serving BS for handover of the MS, and the second BS is a previous serving BS when the MS enters the CLC mode.

14. A Mobile Station (MS) for supporting a Co-Located Coexistence (CLC) mode, comprising:
 a transmission module for controlling transmission of a message related to the CLC mode;
 a reception module for controlling reception of a message related to the CLC mode;
 a memory for storing parameters and information elements related to the CLC mode; and
 a processor for controlling an operation related to the CLC, mode by:
  transmitting, in the CLC mode, a handover request message to a Serving Base Station (SBS) to initiate a handover process;
  receiving, from the SBS, a handover command message acknowledging the handover request message;
  transmitting a ranging request message to a target Base Station (TBS) at network reentry after handover; and
  receiving, from the TBS, a ranging response message including CLC start time information that is set by the TBS.

15. The mobile station according to claim 14, wherein:
 the CLC start time information indicates a CLC start time; and
 the CLC start time information comprises a SuperFrame Number (SFN) field indicating a superframe number of the CLC start time and a start frame index (SFI) field indicating a frame index of the CLC start time.

16. The mobile station according to claim 15, wherein the ranging response message further comprises a CLC identifier identifying a class of the CLC mode.

17. The mobile station according to claim 14, wherein the CLC mode is a type I CLC mode or a type II CLC mode.

18. The mobile station according to claim 14, wherein:
 the CLC start time information is set by the TBS based on CLC information obtained from the SBS via a backbone, network; and
 the CLC information comprises a CLC active cycle and a CLC active interval.

* * * * *